May 24, 1966  E. JABLONSKY ETAL  3,252,380
AUXILIARY POWER STEERING ARRANGEMENT, ESPECIALLY
FOR MOTOR VEHICLES
Filed July 31, 1963  9 Sheets-Sheet 1

Fig. 1

May 24, 1966 E. JABLONSKY ETAL 3,252,380
AUXILIARY POWER STEERING ARRANGEMENT, ESPECIALLY
FOR MOTOR VEHICLES
Filed July 31, 1963 9 Sheets-Sheet 3

May 24, 1966 E. JABLONSKY ETAL 3,252,380
AUXILIARY POWER STEERING ARRANGEMENT, ESPECIALLY
FOR MOTOR VEHICLES
Filed July 31, 1963 9 Sheets-Sheet 7

Fig. 8

United States Patent Office 3,252,380
Patented May 24, 1966

3,252,380
AUXILIARY POWER STEERING ARRANGEMENT, ESPECIALLY FOR MOTOR VEHICLES
Erich Jablonsky, Karl-Heinz Liebert, and Heinrich Wagner, Schwabisch Gmund, Germany, assignors to Zahnradfabrik Friedrichshafen Aktiengesellschaft, Friedrichshafen, Germany
Filed July 31, 1963, Ser. No. 299,050
18 Claims. (Cl. 91—391)

This invention relates to auxiliary or booster steering arrangements for motor vehicles and more particularly to a construction wherein booster power is cut off at a predetermined point in the course of rotation of the steering column. Attention is called to assignee's prior patent to Jablonsky, No. 3,047,087, issued July 31, 1962, which patent discloses arrangements for predetermined booster power cut-off. The present invention is an improvement thereover, in that control of pressure to the booster piston is effected directly by an element of the steering mechanism, for example, the gear segment, operated by the booster piston which in turn actuates the steering mechanism.

Attention is also called to assignee's copending application, Serial No. 299,051, filed July 31, 1964, wherein a mechanism is disclosed for permitting axial movement of a steering column to an extent of predetermined play in either axial direction. Thus, a disc integrally concentric with the steering column engages on respective sides, through needle bearings, a ring which is spring-biased to exert pressure on the disc and thus maintain it and the steering column in an initial wheels straight ahead position. Each such ring is axially guided and movable in respective housing recesses to permit axial movement of the steering column. Road reaction, as the steering column is initially rotated, causes lost motion axial movement of the column against the bias of either set of springs acting against a respective ring, to the extent of play permitted by the axial depth of recess for each ring.

A particular feature of the present invention is the elimination of stops in the housing, thus eliminating the need for a specially made housing, for example, housings as shown in the patent referred to above. Accordingly, the present invention is readily applicable to various kinds of booster cylinder arrangements of any type. Further, the construction of the present invention has less possibility of failure and jamming than known prior constructions.

Thus, the objects of the present invention are to overcome the disadvantages of the prior art, as generally described above, and other objects and features will be apparent in the detailed disclosure that follows.

A number of modifications of the invention are disclosed herein, but the principal concept is to utilize the gear segment which is operated by racks integral with the booster piston for the purpose of controlling valves which in turn control the pressure medium, usually oil, to the booster cylinder. Thus, in certain forms of the invention, such valves are controlled by means of connecting rods geared for actuation by the steering mechanism gear sector or segment. In other forms of the invention such gear sector actuates a rack which controls valves, or a reciprocal spool valve.

A detailed description of the invention now follows in conjunction with the appended drawing in which are shown various modifications for positive force actuation of booster oil pressure valving control, thus.

Figure 1:
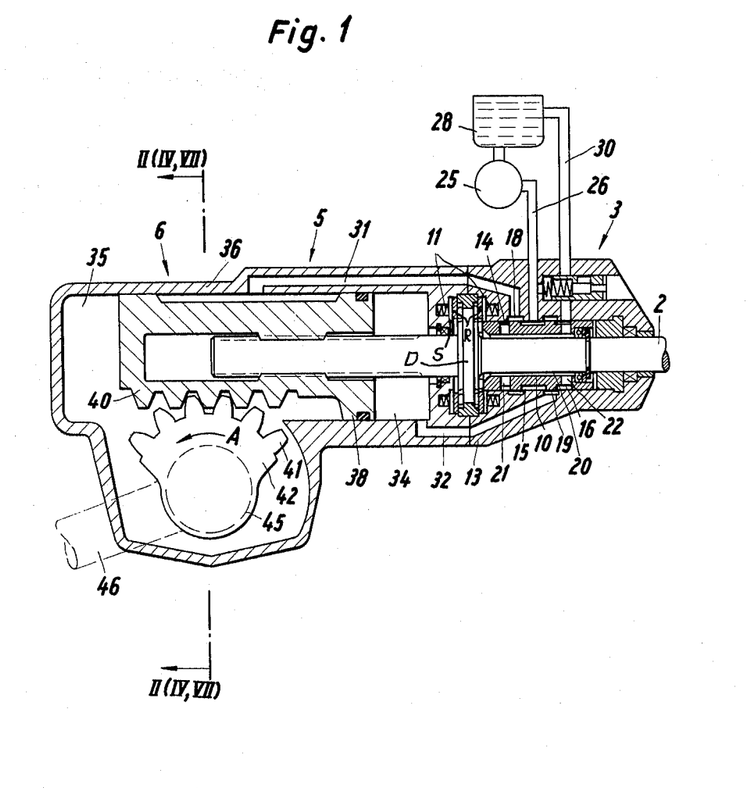
FIG. 1 is a longitudinal cross section of a modification of the invention.
Figure 4:
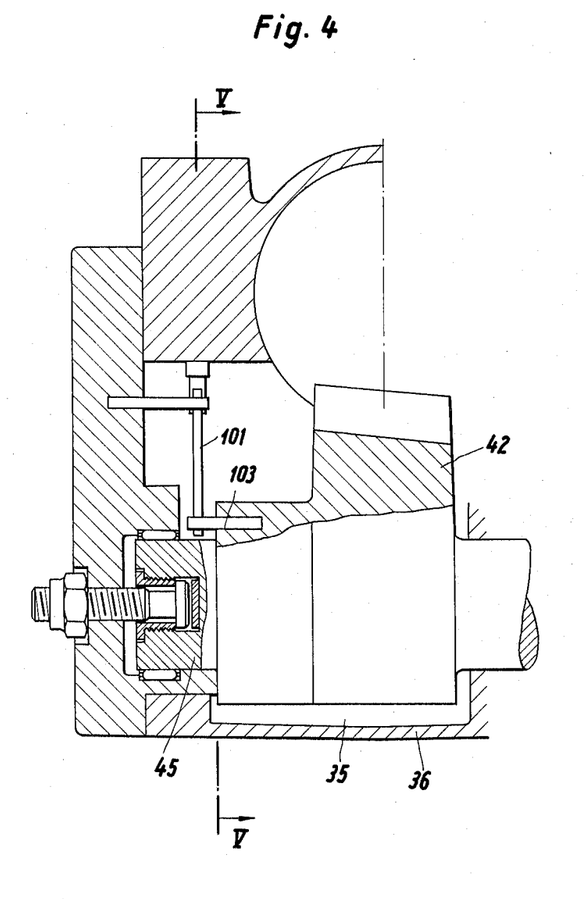
FIG. 4 is a transverse section taken through the axis of the housing of the booster cylinder and showing changes which effect another modification of the invention.
Figure 7:
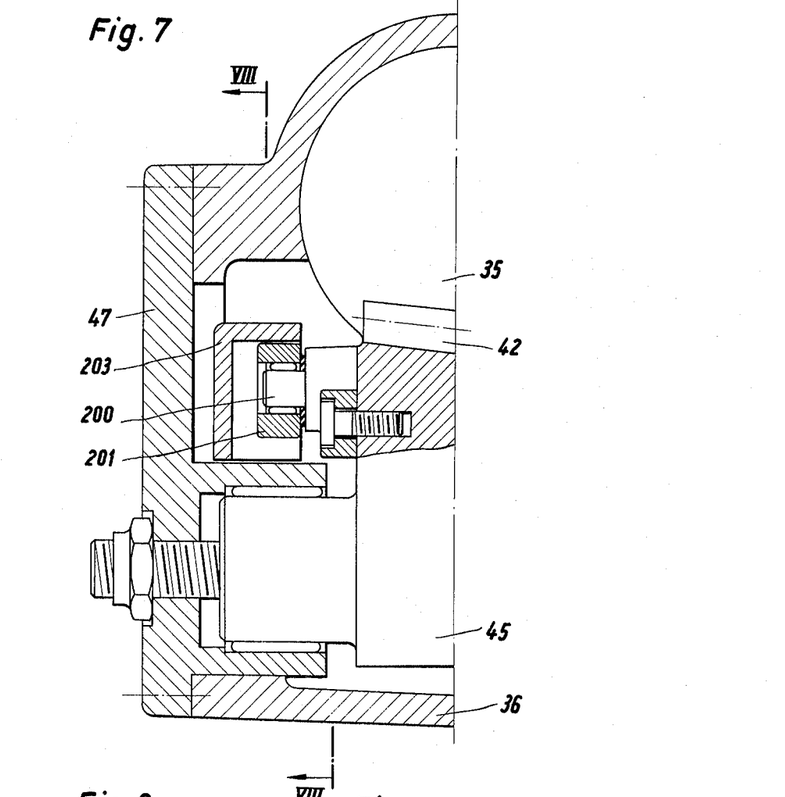
FIG. 7 is a still further modification of the invention shown as a sectional view taken transversely through the booster cylinder housing.

The section lines IV—IV, VII—VII, on FIG. 1 indicate the planes in which the structure has been modified, to effect the modifications of FIG. 4 and FIG. 7.

Figure 2:
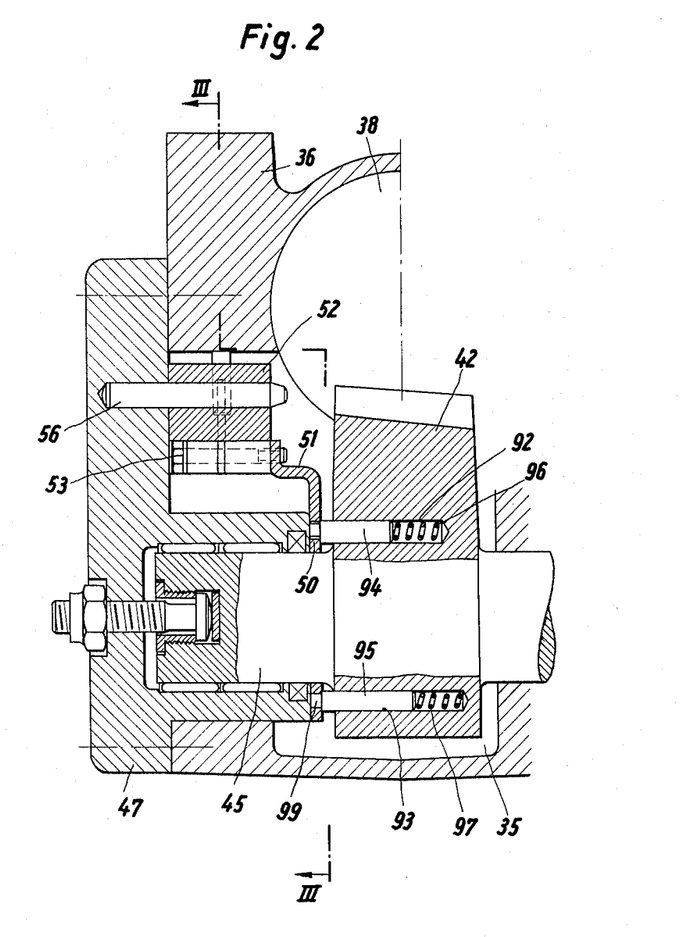
FIG. 2 is a section through II—II of FIG. 1.
Figure 3:
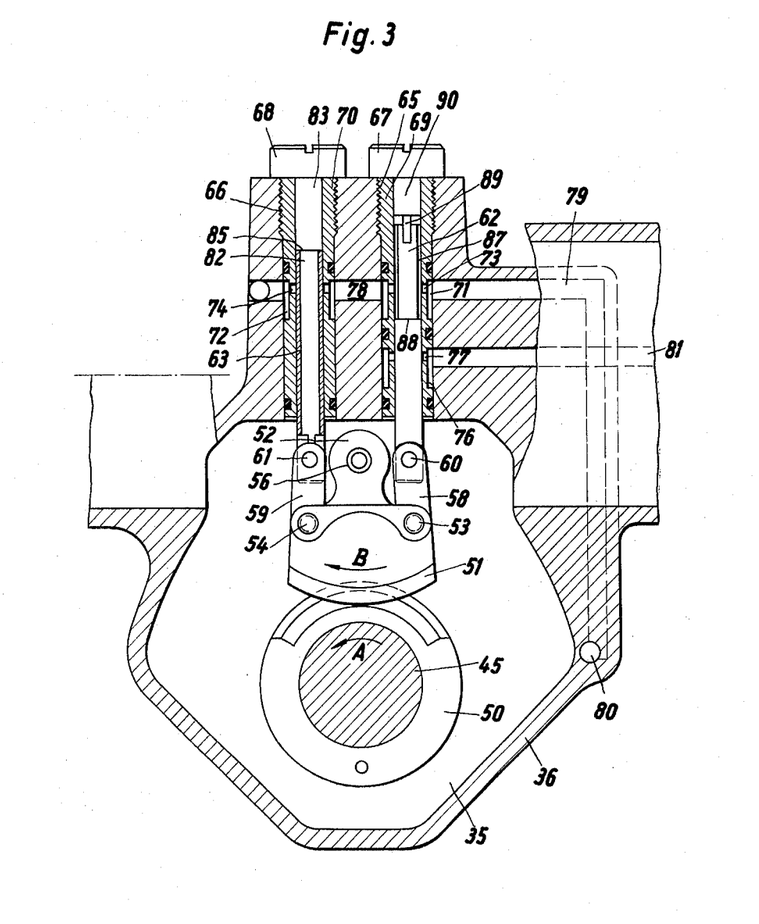
FIG. 3 is a section through III—III of FIG. 2.

In FIGS. 1–3 an auxiliary power steering construction is shown comprised of a pressure control component 3 disposed concentrically to the steering column 2, of a servo motor component 5, having a double action piston 38 which operates steering gear component 6, consisting of racks 40 on the piston and teeth 41 on gear segment 42. The control component 3 consists of a spool valve sleeve 10 in a housing 13 concentric to the steering column 2 and such valve sleeve is fixed axially on the steering column, although the column can rotate relative thereto to effect a steering function.

The steering column can move axially in relation to sleeve valve housing 13 from a central or neutral position (wheels straight) in either direction, against the bias of angularly arrayed springs 11 by the amount of the steering play in either direction, as shown and described in copending application, S.N. 299,051, filed July 31, 1964.

Thus, a flange or disc D on steering column 2 is abutted on each side via needle bearings by a ring R. Each ring R is spring biased as by the springs 11 to maintain a force balance on the disc D which holds the steering column 2 in an initial, i.e., a "wheels straight ahead" position. However, each ring R has a certain degree of play or lost motion, against its spring bias, into a respective recess S, one such recess being in the main body housing 36 for the ring on the left-hand side of disc D, and the other such recess being in the body closure 13 for the right hand ring. Accordingly, when the steering column 2 is rotated in either direction, the frictional road resistance holding the vehicles wheels against turning will hold the booster piston 38 initially stationary and, therefore, due to conventional threaded connection between the steering column and the piston, the steering column will shift axially in one direction or the other depending upon the direction of rotation which has been imparted to it by the steering wheel (not shown). Such initial axial motion is determined by the axial depth of the recesses since the rings bottom in the respective recesses to limit the lost motion in either direction. Such lost motion of the column carries the valve sleeve 10 therewith for control of the pressure fluid to and from the booster cylinder chambers 34 and 35.

The sleeve 10 has oil flow grooves 14, 15, 16 which coact with respective grooves 18 and 19 inside the bore of the valve housing 13. Between the steering column 2 and the sleeve 10, an annular recess 20 is disposed, which is in constant connection with the annular grooves 14 and 16, via the radial bores 21 or 22 in sleeve 10. The annular groove 15 is connected with the pressure line 26 leading to the oil pump 25, while the annular grooves 14 and 16 are connected to the oil return line 30, leading to the sump tank 28 via the bores 21 or 22, respectively. From the annular grooves 18 and 19, respective channels 31 and 32 lead to the respective cylinder chambers 34 or 35, which are formed within the steering gear housing 36, serving as a double ended cylinder having the two-face auxiliary power piston 38. The auxiliary power piston 38 is threaded on to the steering column 2 as heretofore mentioned and actuates a steering mechanism.

For this purpose, two gear racks 40 have been formed on the power piston 38, which racks mesh with teeth 41 of a gear sector or segment 42. The segment is keyed to a steering shaft 45 which, at its very end, bears the steering gear arm 46, whereby the latter is attached to the steering linkage (not shown).

As will be understood from FIGS. 2 and 3, steering shaft 45 carries a gear sector 50 which is in continuous mesh with a gear segment 51. The latter is attached to a rockable or pivotal pendulous link 52 through screws 53 and 64, wherein the link 52 is mounted rotatably on a pin 56 supported by a cover 47 of the housing 36. The two screws 53 and 54 also serve as swivel pins for respective connecting rods 58 and 59. The rod ends are pivotally connected to valve pistons 62 and 63, respectively, by means of respective bolts 60 and 61.

The two valve pistons 62 and 63 are slidable in respective valve sleeves 69 and 70, which sleeves can be axially locked by means of lock nuts 67, 68 respectively, in housing 36 into which they are threaded as by threads 65, 66, to thus predetermine desired axial positions therein which control the booster power cut-off permits.

Sleeves 69 and 70 have exterior peripheral annular grooves 71 and 72, respectively, connecting with radially directed bores 73 and 74, respectively. The valve sleeve 69 has a second exterior groove 76, at a fixed distance from the annular groove 71 and radially directed bores 77 leading thereto. The annular grooves 71 and 72 are connected via channels 78 and 79 respectively with a return line 80 leading to the sump tank 28, while the annular groove 76 is connected with the cylinder chamber 34 of the servo motor 5 via a channel 81.

The valve piston 63 has an axial bore 82 which communicates at one end with a chamber 83 in the valve sleeve above the valve piston and which chamber is otherwise closed at its upper end. Bore 82 also connects, at its lower end with cylinder chamber 35 of the servo motor 5. The valve piston 63 has a leading edge 85 to close or open bores 74 leading to the return passages 78, 79, 80.

Valve piston 62 has an annular recess of groove 87 terminating at a shoulder 88, the annular groove 87 communicating with a slot 89 open to chamber 90 in sleeve 69, the chamber being closed at its outer end.

Since the steering gear under discussion has a gear 42 with slanted teeth so that the steering shaft 45 is adjustable in the direction of its longitudinal axis for the purpose of eliminating play, the gear sector 50 is keyed to but axially slidable on steering shaft 45. In order to assure mesh between the gear sector 50 and the gear segment 51 of all positions of the steering shaft 45, pins 94 and 95 are disposed in axial bores 92 and 93, respectively, of gear segment 42 and springs 96 and 97 under pre-stress in the bores 92 and 93, respectively, bias the pins towards cover plate 47. The pin 95 has a protruding end section 99 within a bore in the gear sector 50 and is supported by its shoulder against the surface of the sector 50, thus pressing it against the cover plate and keying the members 45 and 50. The pin 94 has no protruding end section, but presses against the meshing teeth of members 50 and 51 and against portions of those members, to bias wheel 50 against the cover 47.

The mode of operation of the described arrangement is as follows:

Assuming the steering column 2 is turned to the right, the corresponding frictional road resistance acting against the wheels will, as hereinabove explained, momentarily keep piston 38 stationary and, thus, the initial rotation of the column will merely cause the column to shift axially since it is threaded into the piston 38. The direction of axial shift depends, of course, on the direction of rotation of the steering column and this effects shifting of the valve spool 10 with respect to the valve sleeve 13. Accordingly, pressure in line 26, assuming spool 10 moves to the right, will be communicated via groove 15 to groove 19 and passage 32 to cylinder chamber 34. Such pressure will then move piston 38 to the left whence rotation of gear segment 42 is effected to actuate the steering mechanism (not shown) in the usual manner via link 46. In the course of this action, however, the gear sector 50 is rotated along with steering shaft 45 in the direction of arrow A, thus rotating the gear sector 51 along with the pendulous link 52 in the direction of the arrow B. Accordingly, the valve piston 62 moves downwardly, as viewed on FIG. 3, until shoulder 88 clears the bore 77 to establish a connection between the return line 79 and the line 81, which leads to cylinder chamber 34 of the servo motor. Thus, this chamber exhausts and no further motion of the piston 38 can be effected by the pressure therein. Simultaneously, the valve piston 63 moves upwardly and keeps bores 74 closed off and communication between the piston chamber 35 of the servo motor and the return channel 78 being blocked. Inasmuch as the pressure fluid connects through the tubular valve piston 63 from chamber 35 to chamber 83, via bore 82, the movement of valve piston 63. However, at the same time chamber 35 is exhausted to sump 28 via the various passages 31, 18, 14, 21, 20, 22, 30, which are open since spool 10 is in its right hand position due to the axial displacement of the column 2 with respect to the valve sleeve 13. Further steering wheel rotation can effect, by manual force, the extreme limit of steering motion.

If the steering column be rotated in the opposite direction, the valve spool 10 then moves to the left establishing communication from pressure line 26 via the various passages 15, 18, 31 to chamber 35 whence piston 38 moves to the right effecting steering in a direction accordingly. Again, the lost motion of steering column 2 permits the motion to the right of the valve spool as provided by the lost motion mechanism described, acting against bias of the left-hand set of springs 11, as viewed on FIG. 1. Again, the gear sector 50 is rotated, but this time in the opposite direction affecting rotation of the gear sector 51 in a direction opposite to the arrow B whence, by action of the con rods 58 and 59, the valve piston 63 moves downwardly, this time to open communication between chamber 35 and the sump tank 28 via bore 82 when the edge 85 of the valve piston moves below the ports 74. Accordingly, chamber 35 loses its pressure and booster power is cut-off. At the same time the shoulder 88 moves up past the ports 73. Communication from chamber 35 to sump tank 28 is then open through annular groove 71 and return passage 79. However, at the same time chamber 34 is exhausted to sump 28 via the various passages 32, 19, 16, 22, 30, which are open since spool 10 is in its left hand position due to the axial displacement of the column 2 with respect to the valve sleeve 13.

It will be noted that, due to the axially adjustable positions of the valve sleeves 69, 70, an exact cut-off point of pressure to either end of piston 38 can be effected. Thus, any desired extent of power steering can be applied up to the point where manual effort must take over. It will be further noted that the valve sleeves are independently adjustable of each other so that power steering can cease at a desired point for either direction of steering.

Figure 5:
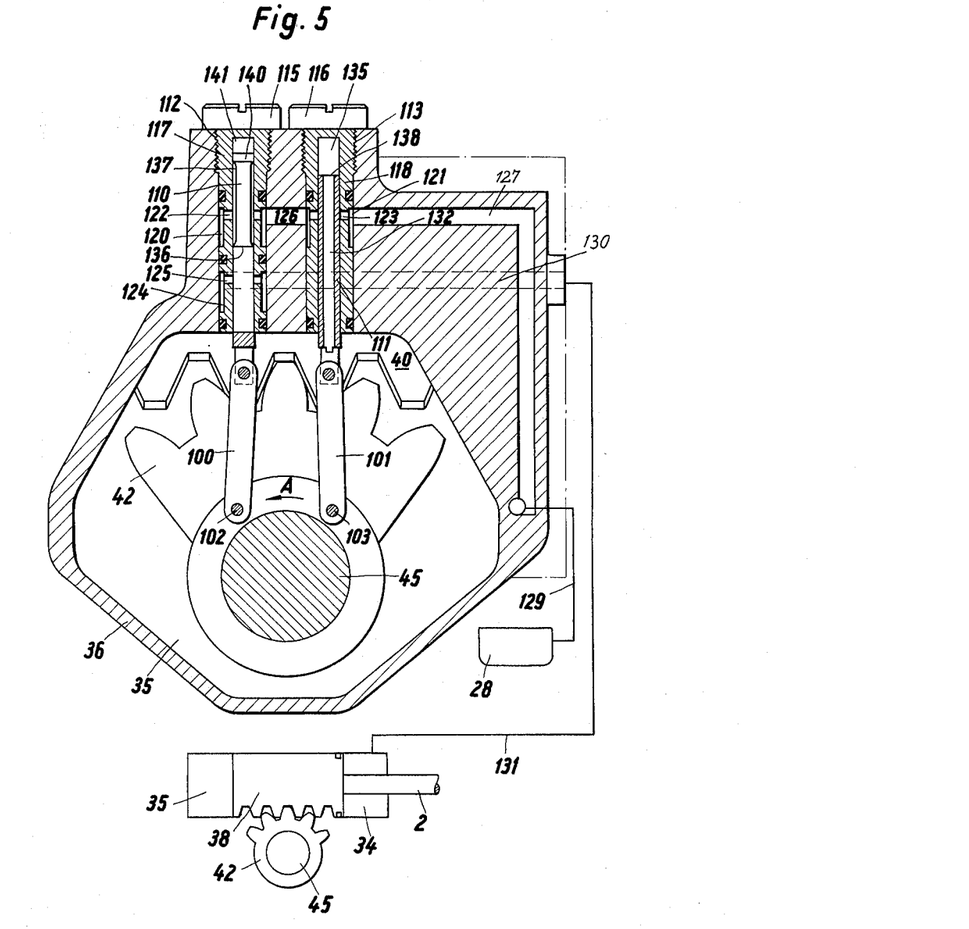
FIG. 5 is a section through V—V of FIG. 4.

FIGS. 4 and 5 show a modification which differs from the preceding embodiment, in that con rods 100 and 101 are pivoted at one end on both sides of the vertical longitudinal central plane of the steering shaft 45, on pins 102 and 103 in the gear segment 42. The connecting rods 100 and 101 are pivotally connected at their other ends to the respective valve pistons 110 and 111. These two valve pistons are slidable in respective valve sleeves 117 and 118, which can be locked in position by means of locknuts 115 and 116, respectively, within bores in the housing, being threaded as by threads 112 and 113, respectively, into the steering gear housing 36.

The valve sleeves have respective annular oil flow grooves 120 and 121 connecting with radial bores 122 and 123, respectively. At a predetermined distance from groove 120, the valve sleeve 117 has a further groove 124 connecting with radial bores 125. Grooves 120 and 121 are connected via a channel 126 in the housing and are connected via a housing channel 127 to the return line 129 leading to the sump tank 28. Groove 124 is connected via a channel 130 with the cylinder chamber 34 of the servo motor. The valve piston 111 has an axial bore 132 communicating at one end with end chamber 135 in sleeve 118 and at the other end with cylinder chamber 35 of the servo motor within housing 36. Valve piston 111 has a terminating edge 138 for closing or opening the bores 123 which lead to the return passages 126, 127 and 129. The valve piston 110 has a groove 137 terminating in shoulder 136 at one end and connecting with a slit 140 at its other end. Slit 140 communicates with closed chamber 141 in the end of sleeve 117.

The mode of operation is as follows:

When the steering column is rotated, for example clockwise, the action is the same as heretofore described in connection with the form of the invention shown in FIGS. 1 to 3, in that piston 38 moves toward the left and the gear segment 42 rotates in the direction of the arrow A. Accordingly, the connecting rods 100 and 101 move downwardly and upwardly, respectively, along with the articulated respective valve pistons 110 and 111. Movement of the valve piston 110 will open the return bores 125 when shoulder 136 moves down therepast, to open chamber 35 to sump tank 28 via the various passages 124, 125, 137, 122, 120 and 127. At the same time, shoulder 138 has moved up past bores 123 to block flow from chamber 35 to the sump tank 28. Thus, power steering is cut off and manual steering takes over at this point.

In the event the steering column is rotated in the opposite direction, the bores 125 in valve sleeve 117 remain closed by the body of the piston valve. Chamber 34 is exhausted through the valving 10 to 13 operated by the steering column, as heretofore explained in connection with FIGS. 1–3. At this time valve piston 111, in moving downwardly, opens bores 123 as the shoulder 138 moves downwardly therepast, and pressure fluid now exhausts to the sump tank from chamber 35 via various passages 132, 123, 121, 126, 127 and 129. Again, power booster is thus cut off and manual steering takes over.

It will be noted that in this modification the valve sleeves 117 and 118 are independently adjustable in the housing 36 so that their axial positions can be set for any desired cut-off point in either direction of steering.

Figure 6:
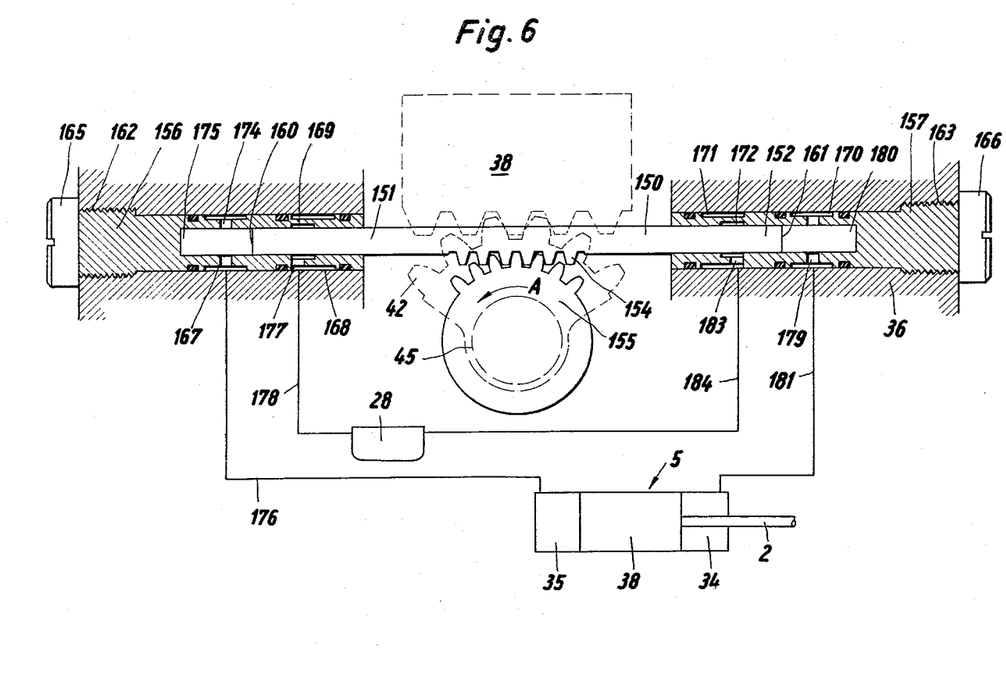
FIG. 6 is a further modification of the invention as illustrated by a longitudinal cross section of the valving, the view being on a plane transverse to the axis of the gear sector which controls the steering mechanism.

A further modification is shown in FIG. 6 wherein cut-off valves are disposed coaxially with each other and transversely of the steering shaft 45. Thus, a rod 150 has valve piston elements 151 and 152 and is formed with a gear rack 154 in constant mesh with the gear sector segment 155 fixed on the steering shaft 45. The valve piston elements 151 and 152 extend into respective valve sleeves 156 and 157, and they have respective ends 160, 161. The valve sleeves 156 and 157 have various annular oil flow grooves to be described and can be secured by means of respective threads 162 and 163 into the steering gear housing 36 (or into external housings), and locked in any desired predetermined axial position by means of respective locknuts 165 and 166. Thus, the positioning of the valve sleeves selectively determines the stroke of the servo piston 38 in delivering booster power, i.e., the cut-off points.

Sleeve 156 has flow grooves 167, 168 and 169, and sleeve 157 has flow grooves 170, 171 and 172, grooves 169 and 172 being internal and adjacent external grooves 168 and 171, respectively. Groove 167 communicates via bore 174 with chamber 175 in valve sleeve 156 and via line 178 with the cylinder chamber 35 of the servo motor. Grooves 168 and 169 communicate with each other via a radial bore 177, and the annular groove 169 is connected with the sump tank 28 via line 178. In the same manner, the annular groove 170 of the valve sleeve 157 is connected with the chamber 180 in sleeve 157 via radial bores 179, and with the cylinder chamber 34 of the servo motor via a line 181. The annular grooves 171 and 172 connect by means of radial bores 183, and the annular groove 172 connects to the sump tank 28 via a line 184.

The mode of operation is as follows:

When the steering column is rotated to effect movement of piston 38 to the left, all in the manner heretofore described, the steering shaft 45 rotates in the direction of the arrow A, thus shifting valve piston rod 150 to the left via the gear rack whence the end 161 clears groove 172 for communication with the chamber 180. This exhausts servo motor chamber 34 to the sump tank 28 via the various passages 181, 170, 179, 180, 172, 183, 171 and 184. Accordingly, booster steering power is cut off from chamber 34 whereas chamber 35 is exhausted through valving 10–13, as heretofore explained. When the steering column is rotated in an opposite direction so that the valve piston is moved to the right, chamber 35 of the servo motor is exhausted via passages 176, 167, 174, 175, 169, 177, 168, 178 to sump tank 28, when the piston 38 reaches its cut-off point through valve piston 151. Chamber 34 is exhausted through valving 10–13. In this modification, the valve sleeve 156, 157 are likewise adjustably secured in axial position so that the cut-off point for booster steering can be predetermined for either direction of steering.

In FIGS. 7 to 10 a modification is shown wherein steering shaft 45 carries a freely rotatable roller 201 via a bearing pin 200. The roller has a shroud or yoke element 203 with side flanges that are secured to respective guide rods 204, 205 which are coaxial and reciprocally supported as in a bore 207 of the steering gear housing, which bore is closed at its outer end and communicates with axial bore 209 in rod 204 so as to constantly communicate with the cylinder chamber 35 of the servo motor. The rods change the arcuate motion of roller 201 into straight line movement as member 45 rotates, and rod 205 serves as a double acting valve piston. The valve piston portion of the rod 205 is slidably guided inside two valve sleeves 210 and 211, sleeve 211 being concentrically within sleeve 210, and the sleeve 210 being secured by threads 217 to the housing 36. Sleeve 211 is secured to a sleeve 234 by threads 223, which latter sleeve is adjustable, as later described.

Figure 8:
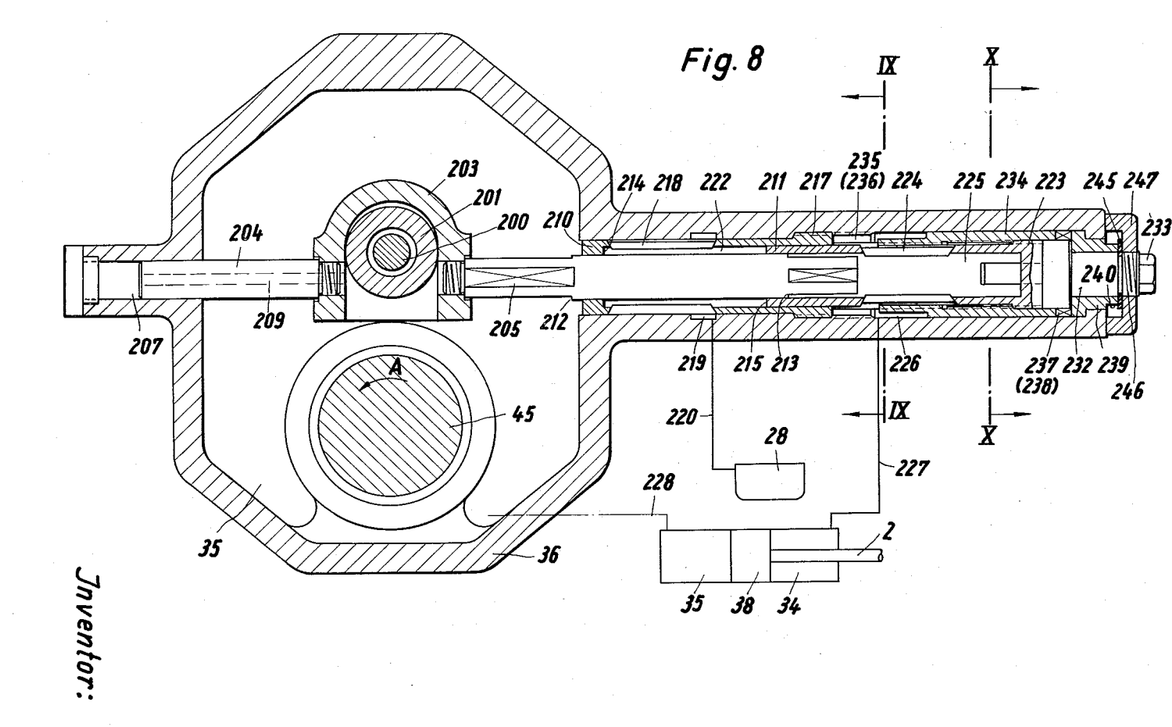
FIG. 8 is a section through VIII—VIII of FIG. 7.
Figure 9:
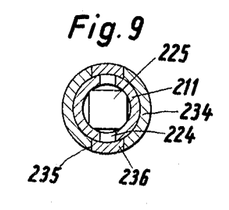
FIG. 9 is a section through IX—IX of FIG. 8.
Figure 10:
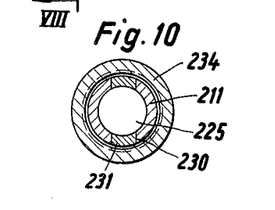
FIG. 10 is a section through X—X of FIG. 8.

The valve piston has opposed shoulders 212 and 213 which cooperate with corresponding respective shoulders 214, 215 of the valve sleeve 210 for flow control. The valve sleeve 210 has longitudinal slots 218, which are in connection with an annular groove 219 in the housing 36. The annular groove 219 is in connection with the sump tank 28 via a line 220. Between the rod 205 and the valve sleeve 210 a concentric spacing 222 is effected. The valve sleeve 211 has longitudinal slots 224 which communicate with the hollow interior chamber 225 within that sleeve. The longitudinal slots 224 also communicate with an annular concentric spacing 226, which spacing communicates via a line 227 with the cylinder chamber 34 of the servo motor.

For simplicity of illustration in FIG. 8, the servo motor has been shown schematically and a connection line 228 has been drawn between actual representation of the cylinder chamber 35 and the schematic representation.

The valve sleeve 211 has longitudinal key slots 230, which mesh with finger projections 231 of an adjusting shaft 232, held in the gear housing 36 (FIG. 10), which adjusting shaft 232 has an hexagonal head 233 for a wrench. Further, valve sleeve 211 is surrounded by the previously mentioned sleeve 234 which effects axial adjustment, as heretofore mentioned, as by threads 223. Thus, rotation of the shaft 232 rotates sleeve 211, sleeve 234 remaining stationary. Since sleeve 211 is threaded at 223 to sleeve 234, sleeve 211 will move axially. The adjusting sleeve 234 has longitudinal key slots 235 which mesh with correspondingly shaped finger projections 236 extending from the valve sleeve 210. Sleeve 234 is rotatable by a sleeve 239 via claws 237 and 238 on respective sleeves, wherein sleeve 239 will be understood to have suitable surfaces, such as 240, for the purpose of applying a wrench for adjusting axial position of sleeve 211 by rotation of sleeve 234, sleeve 211 being held against rotation at this time by being keyed to shaft 232. The sleeve 239 is locked against axial movement by disc 245 on shaft 232, which shaft has a thread 246 for locknut 247 which engages the end of the housing.

The mode of operation is as follows:

If the steering column be rotated to effect rotation of the gear segment 42 in the direction of the arrow A, the roller 201 is carried therewith and, acting against the yoke 203, effects shifting of the valve piston 205 to the left, whence the shoulder 213 goes beyond the shoulder 215 of the sleeve 211 to open communication between cylinder chamber 34 to the sump tank via the various passages 227, 226, 224, 225, 222, 218, 219 and 220. Accordingly, chamber 34 is exhausted and auxiliary power cut off. On the other hand, if the steering wheel be rotated in the opposite direction, then the piston 205 is shifted toward the right and the shoulder 212 clears the shoulder 214 of the sleeve 210 and chamber 35 is then exhausted via the various passages 228, 222, 218, 219 and 220 to the sump tank 28.

In either case, when one chamber is open to exhaust, manual effort on the steering column, completes the steering movement, the other chamber exhausting through the valving 10–13.

Figure 11:
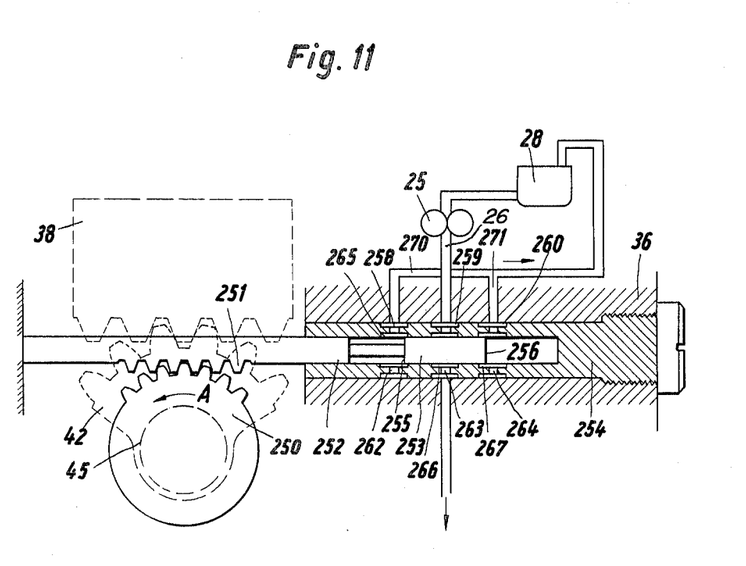
FIG. 11 illustrates, by way of a cross sectional elevation view of the valving an even further modification of the invention, the view being taken transversely of the steering mechanism gear sector.

FIG. 11 shows a modification wherein both chambers of the booster cylinder are cut off by means of a single cut-off valve, although the cut-off points are not adjustable.

In a construction similar to FIG. 6, a gear segment 250 is keyed to the steering shaft 45 and a gear rack 251 integral with a valve rod 252 is provided, the gear segment and rack being in constant mesh. The valve rod carries a valve piston 253 which extends into the bore of a valve sleeve 254 threaded into the steering gear housing 36. The valve piston 253 has opposed shoulders 255 and 256. The valve sleeve 254 has exterior annular grooves 258, 259 and 260, communicating with radially adjacent interior annular grooves 265, 266, and 267, respectively, via respective radially directed bores 262, 263, 264. Lines 270 and 271 which lead to the sump tank 28 connect with the annular grooves 258 and 260 respectively while the pump 25 communicates with the annular grooves 259–266 in the sleeve and thence with the booster cylinder via the line 26.

The mode of operation is as follows:

If the steering column be rotated so that shaft 45 is rotated in the direction of the arrow A, connection between pressure feed line 26 and return line 271 is established via passages 259, 263, 266, the valve chamber at the right side of piston end 256, 267, 264, 260, 271. This cuts off pressure to both sides of piston 38 for the reason that all pressure from pump 25 goes to the sump as the piston end 256 clears the right-hand end of the groove 266. In a similar manner, when the piston 253 is shifted to the right with opposite directions of steering, the shoulder 255 clears the left-hand end of groove 266, and, again, all pressure from the pump is exhausted to the sum (via line 270) and, accordingly, no pressure can reach either end of the piston 38. Thus, in the first instance, the exhaust flow is via the exhaust passage 271 and, in the second instance, the flow is via the exhaust passage 270, as will be apparent from FIG. 11. In either instance manual steering takes over the steering function and either chamber at the booster piston end can exhaust via the valving 10–13, depending on direction of piston movement. However, due to bypassing of pump pressure via valve 253, no booster pressure is available past the cut-off points determined by the spacing of the grooves 262, 264, etc, as related to the spacing between the valve ends 255 and 256.

Having thus described our invention, we are aware that various changes may be made without departing from the spirit thereof and, therefore, do not seek to be limited to the precise illustrations herein given, except as set forth in the appended claims.

What is claimed is:

1. A booster steering system comprising a double chamber cylinder and a reversibly movable piston therein having a face in each chamber, a steering mechanism member supported for reversible movement and operatively connected to said piston for reversible movement thereby; means comprising valve elements operatively connected to said member and reversibly movable thereby for releasing pressure from said cylinder responsive to movement of said piston to a predetermined degree in either direction, and a manually operable steering column connected to said piston for exerting manual steering force thereon and means whereby said manual force can be exerted on said piston subsequent to release of pressure from said cylinder.

2. A steering system comprising a steering column, a double chamber cylinder and a reversibly movable double face piston having a face in each chamber, said column and piston having a connection whereby rotation of said column can effect manual force movement of said piston in either direction, a steering member operatively connected to said piston and reversibly movable thereby to actuate a steering mechanism; means for providing booster pressure to either chamber responsive to direction of rotation of said column, pressure cut-off valve elements operatively connected to said member and reversibly movable thereby, and means controlled by said valve elements to exhaust either cylinder chamber at a predetermined point prior to full traverse of said piston in either direction, whereby booster pressure is removed and continued movement of said piston is effected by manual force.

3. A booster steering system comprising a double chamber cylinder and a reversibly movable piston therein having a face in each chamber, a steering mechanism shaft supported for reversible rotative movement and operatively connected to said piston for reversible movement therewith; valve elements operatively connected to said shaft and reversibly movable therewith for releasing pressure from said cylinder responsive to movement of said piston to a predetermined degree in either direction, said valve elements comprising a pair of slidable valve members, a gear segment on said shaft and pivotal link actuating means comprising another gear segment meshing with said first-mentioned gear segment for actuating said valve members.

4. A booster steering system comprising a housing having double chamber cylinder and a reversibly movable piston therein having a face in each chamber, a steering mechanism member supported for reversible movement and operatively connected to said piston for reversible movement thereby; valve means operatively connected to said member and reversibly movable thereby for releasing pressure from said cylinder responsive to movement of said piston to a predetermined degree in either direction, said valve means comprising a slidable spool valve supported by said housing for reciprocal movement in the direction of its axis, said steering mechanism member comprising a rotative shaft having an axis transverse to said spool axis.

5. A booster steering system comprising a double chamber cylinder and a reversibly movable piston therein having a face in each chamber, a steering mechanism member supported for reversible movement and operatively connected to said piston for reversible movement thereby; valve elements operatively connected to said member and reversibly movable thereby for releasing pressure from said cylinder responsive to movement of said piston to a predetermined degree in either direction, said valve elements comprising a slidable spool valve mounted for reciprocal movement in the direction of its axis, said steering mechanism member comprising a rotative shaft having an axis transverse to said spool axis.

6. A booster steering system comprising a double chamber cylinder and a reversibly movable piston therein having a face in each chamber, a steering mechanism member supported for reversible movement and operatively connected to said piston for reversible movement therewith; spool valve means operatively connected to said member and reversibly movable therewith for releasing pressure from said cylinder responsive to movement of said piston to a predetermined degree in either direction, and ported valve sleeve means coacting with said valve spool means and means for adjusting the position thereof so as to predetermine the pressure release point of said cylinder.

7. A steering system comprising a steering column, a double chamber cylinder and a reversibly movable double face piston having a face in each chamber, said column and piston having a connection whereby rotation of said column can effect manual force movement of said piston in either direction, a rotative steering shaft operatively connected to said piston and reversibly rotated thereby to actuate a steering mechanism, means for providing booster pressure to either chamber responsive to direction of rotation of said column, pressure cut-off slidable valve elements connected to said shaft and reversibly reciprocated thereby, and means controlled by said valve elements to exhaust either cylinder chamber at a predetermined point prior to full traverse of said piston in either direction, whereby booster pressure is removed and continued movement of said piston is effected by manual force.

8. A steering system comprising a steering column, a double chamber cylinder and a reversibly movable double face piston having a face in each chamber, said column and piston having a connection whereby rotation of said column can effect manual force movement of said piston in either direction, a steering member operatively connected to said piston and reversibly movable thereby to actuate a steering mechanism; means for providing booster pressure to either chamber responsive to direction of rotation of said column, pressure cut-off valve elements connected to said member and reversibly movable thereby, and means coacting with said valve elements to exhaust either cylinder chamber at a predetermined point prior to full traverse of said piston in either direction, whereby booster pressure is removed and continued movement of said piston is effected by manual force, said latter means comprising normally stationary adjustable members having ports which can be opened and closed by said valve elements, and means for adjusting said latter members to predetermine the travel of said valve elements for opening and closing said ports to effect said predetermined cut-off point for each chamber of said cylinder.

9. A steering system comprising a steering column, a double chamber cylinder and a reversibly movable double face piston having a face in each chamber, said column and piston having a connection whereby rotation of said column can effect manual force movement of said piston in either direction, a rotative steering shaft operatively connected to said piston and reversibly rotated thereby to actuate a steering mechanism, means for providing booster pressure to either chamber responsive to direction of rotation of said column, pressure cut-off slidable valve elements connected to said shaft and continuously reciprocated thereby, and means controlled by said valve elements to exhaust either cylinder chamber at a predetermined point prior to full traverse of said piston in either direction, whereby booster pressure is removed and continued movement of said piston is effected by manual force, said latter means comprising normally stationary adjustable members having ports which can be opened and closed by said valve elements, and means for adjusting said latter members to predetermine the travel of said valve elements for opening and closing said ports to effect said predetermined cut-off point for each chamber of said cylinder.

10. A steering system comprising a steering column, a housing having a double chamber cylinder and a reversibly movable double face piston having a face in each chamber, said column and piston having a connection whereby rotation of said column can effect manual force movement of said piston in either direction, a steering member operatively connected to said piston and reversibly movable thereby to actuate a steering mechanism; means for providing booster pressure to either chamber responsive to direction of rotation of said column, pressure cut-off reciprocal valve elements in parallel housing bores connected to said member and reversibly movable therewith, and means controlled by said valve elements to exhaust either cylinder chamber at a predetermined point prior to full traverse of said piston in either direction, whereby booster pressure is removed and continued movement of said piston is effected by manual force, said latter means comprising ported axially adjustable sleeves coacting with said valve elements wherein an adjusted position of each sleeve determines the cut-off point of pressure for a respective cylinder chamber.

11. A steering system comprising a rotative steering column, a double chamber cylinder and a reversibly movable double face piston having a face in each chamber, said column and piston having a connection whereby rotation of said column can effect manual force movement of said piston in either direction, a steering member operatively connected to said piston and reversibly movable thereby to actuate a steering mechanism; means comprising a reversible lost motion support for said column operative to permit axial play thereof upon initial rotation and further comprising valve means movable by axial motion of said column, for providing booster pressure to either chamber dependent upon direction of rotation of said column, pressure cut-off valve elements connected to said member and reversibly movable thereby, and means controlled by said valve elements to exhaust either cylinder chamber at a predetermined point prior to full traverse of said piston in either direction, whereby booster pressure is removed and continued movement of said piston is effected by manual force.

12. A booster steering system comprising a double chamber cylinder and a reversibly movable piston therein having a face in each chamber, a steering mechanism member supported for reversible movement and operatively connected to said piston for reversible movement therewith; valve elements operatively connected to said member and reversibly movable therewith for releasing pressure from said cylinder responsive to movement of said piston to a predetermined degree in either direction, and coaxial ported sleeve elements coacting with said valve elements for pressure control, one such sleeve being slidable within another for relative positioning of the ports thereof to predetermine pressure release points.

13. A steering system comprising a steering column, a double chamber cylinder and a reversibly movable double face piston having a face in each chamber, said column and piston having a connection whereby rotation of said column can effect manual force movement of said piston in either direction, a steering member operatively connected to said piston and reversibly movable thereby to actuate a steering mechanism, means for providing booster pressure to either chamber responsive to direction of rotation of said column, pressure cut-off valve means having a reciprocal valve rod connected to said member and reversibly movable thereby, a pair of ported valve sleeves coacting with said valve rod to exhaust either cylinder chamber at a predetermined point prior to full traverse of said piston in either direction, whereby booster pressure is removed and continued movement of said piston is effected by manual force, said valve sleeves being disposed for axial adjustment to position the respective ports thereof relative to the traverse of said valve rod for predetermining said cut-off points, and means for effecting said axial adjustment comprising a housing, one such sleeve being threaded thereto and means comprising a rotative adjusting sleeve keyed to said one sleeve, and means for rotating said adjusting sleeve from outside said housing to axially position said one sleeve, the other valve sleeve having threaded connection within said adjusting sleeve, and means for rotating said other sleeve from outside said housing to effect axial adjustment thereof by virtue of said threaded connection within said adjusting sleeve.

14. A booster steering system comprising double-ended cylinder and a piston therein having a face in each end, a steering shaft supported for reversible movement and operatively connected to said piston for reversible movement therewith; and a reciprocal valve element reversibly movable to exhaust pressure from said system responsive to rotation of said shaft to a predetermined degree in either direction, and means for reciprocally driving said valve element comprising a yoke device secured thereto and a crank means operatively connected to said shaft and extending into said yoke device for alternate engagement with the sides thereof to effect reciprocal motion of said valve rod as said shaft effects reversible rotation.

15. A booster steering system comprising a double chamber cylinder and a reversibly movable piston therein having a face in each chamber, a steering mechanism shaft member supported for reversible rotary movement and operatively connected to said piston for reversible movement thereby; valve means operatively connected to said shaft and reversibly movable continuously thereby for releasing booster pressure from at least one chamber of said cylinder responsive to movement of said piston to a predetermined degree in either direction, and a manually operable steering column connected to said piston for exerting manual steering force thereon and means whereby said manual force can be exerted on said piston subsequent to release of pressure from said cylinder.

16. A steering system comprising a housing, a rotative steering column, a double chamber cylinder in said housing and a reversibly movable double face piston having a face in each chamber, said column and piston having a threaded connection whereby rotation of said column can effect manual force movement of said piston in either direction, a lost motion support for said column affording reversible axial play upon initial steering rotation of said column, a steering shaft connected to said piston and reversibly movable thereby to effect steering, valve means for providing booster pressure to one chamber and to exhaust the other chamber responsive to axial movement of said column, pressure cut-off valve elements operatively connected to said steering shaft and reversibly movable thereby, and means controlled by said valve elements to exhaust one cylinder chamber at a predetermined point prior to full traverse of said piston in either direction and to simultaneously block exhaust from the other chamber whereby booster pressure is removed from said one chamber and continued movement of said piston is effected by manual force, the other chamber exhausting via said valve means.

17. A booster steering system comprising a double chamber cylinder and a reversibly movable piston therein having a face in each chamber, a steering mechanism member supported for reversible travel and operatively connected to said piston for reversible movement thereby; valve elements operatively connected to said member and reversibly movable thereby for releasing booster pressure from said cylinder responsive to movement of said member to a predetermined degree in either direction, said valve elements being operative to bypass a source of fluid under pressure to a sump whereby to prevent pressure fluid from reaching either cylinder chamber when said member arrives at a predetermined point in travel in either direction, and a manually operable steering column connected to said piston for exerting manual steering force thereon and means whereby said manualy force can be exerted on said piston subsequent to release of pressure from said cylinder.

18. A steering system comprising a steering column, a double chamber cylinder and a reversibly movable double face piston having a face in each chamber, said column and piston having a connection whereby rotation of said column can effect manual force movement of said piston in either direction, a steering shaft operatively connected to said piston and reversibly rotative thereby to actuate a steering mechanism, means for providing booster pressure to either chamber responsive to direction of rotation of said column, a pressure cut-off valve rod having a gear rack, a gear segment connected to said shaft and engaging said rack to reversibly reciprocate said valve rod, and means controlled by said valve rod to exhaust either cylinder chamber at a predetermined point prior to full rotative traverse of said shaft in either direction, whereby booster pressure is removed and continued movement of said piston is effected by manual force.

References Cited by the Examiner

UNITED STATES PATENTS

| 2,015,705 | 10/1935 | Bragg | 91—400 |
| 2,800,801 | 7/1957 | Lincoln et al. | 74—388 |
| 2,849,888 | 9/1958 | Herbenar | 74—388 |
| 2,867,129 | 1/1959 | Burton et al. | 74—388 |

FOREIGN PATENTS 137,775   1/1903   Germany.

SAMUEL LEVINE, Primary Examiner.

DAN A. WAITE, Examiner.

J. A. WONG, P. E. MASLOUSKY, Assistant Examiners.